June 17, 1952 L. PATELLA 2,600,570
STONE SAW
Filed Jan. 11, 1950 2 SHEETS—SHEET 1
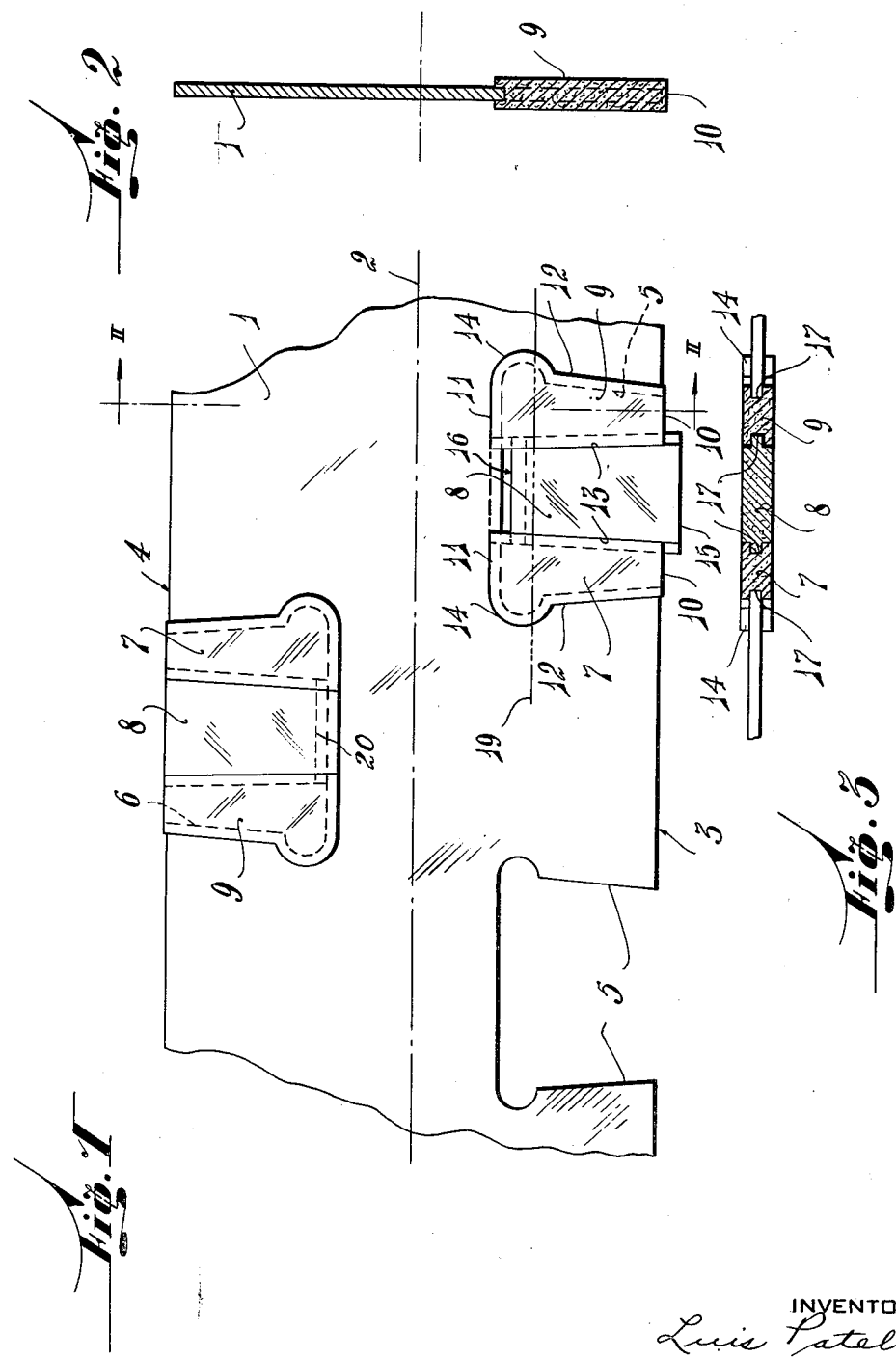
INVENTOR
Luis Patella
BY June 17, 1952  L. PATELLA  2,600,570
STONE SAW
Filed Jan. 11, 1950  2 SHEETS—SHEET 2
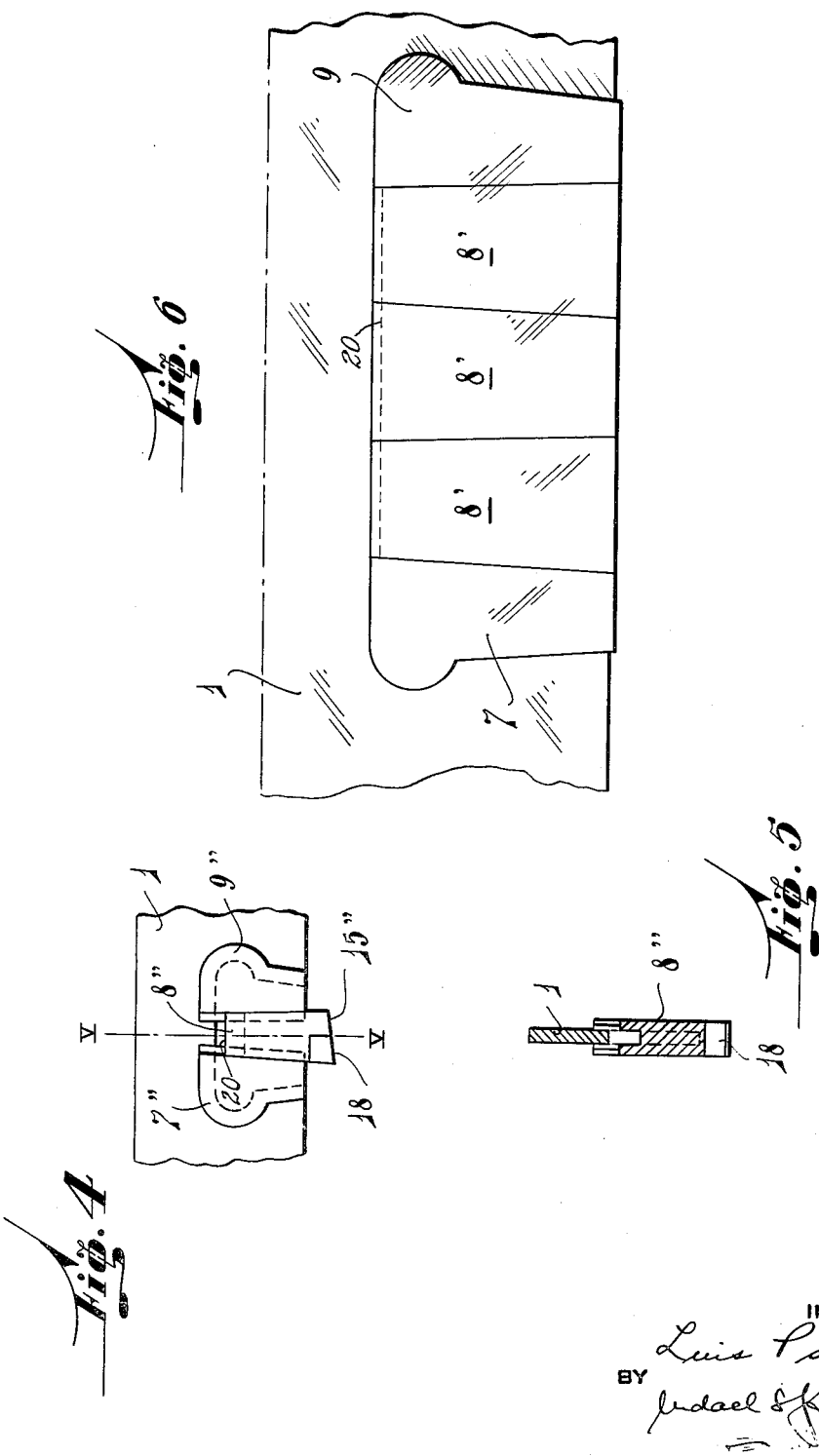
INVENTOR
Luis Patella
BY

UNITED STATES PATENT OFFICE 2,600,570

STONE SAW

Luis Patella, Buenos Aires, Argentina

Application January 11, 1950, Serial No. 137,973
In Great Britain December 8, 1949

10 Claims. (Cl. 125—18)

This invention relates to a new tool of the type of a saw blade especially for cutting marble, granite and similar materials and it refers more particularly to specially combined elements of suitable shapes which may be housed in a cavity or recess arranged therefor in a straight saw blade used in machines, for cutting marble and granite.

In the last few years, the stone industry has dedicated its utmost attention to improving multi-saw blade frames in order to increase the sawing or cutting speed, but in spite of several modifications introduced in the classical machine, such as the elimination of the pendular movement during the working stroke of the frame, the very important problem concerned with the enormous wear and tear of the blades, which is a fundamental factor which influences the output efficiency of said machines, has not been solved up to the date.

Nowadays, stone blocks are cut by means of machines having mainly a frame, preferably a rectangular frame supporting parallel to its longitudinal center line a plurality of spaced cutting blades. This frame is preferably driven according to a rectilinear path during the working stroke and a non-rectilinear path during the recoil stroke. A cutting or rasping effect is achieved by dropping abrasive grits with or without a suitable lubricant, as for instance sand or steel particles and water, on the cutting surface formed by said blades on the block in the machine, which substances are shifted by exercising a rasping and/or cutting action on the surfaces due to the pressure and movement provided by the blades supported by said rectangular frame.

It is obvious that the wear and tear of the blades is very high and therefore these blades must be changed after a very short period of use.

The present invention has substantially overcome the above pointed out drawback and it consists in a new tool of the type comprising a saw blade for cutting marble, granite and the like material, which comprises a support having an outer surface or edge for contacting the material to be worked by means of said tool, wherein the support is provided with at least one recess substantially defined by two lateral faces converging towards the outer surface, said recess constituting a housing for at least a part of a cutting means of said tool, which cutting means comprises at least three elements including a wedge-like element having a pair of opposed edges, and a pair of lateral elements each having a pair of opposed sides, one of the sides of each of said lateral elements engaging a respective one of said lateral converging faces and each of said edges of said wedge-like element engaging the outer side of one of said lateral element, said wedge-like element at least having cutting tool properties and said three elements substantially filling the space formed by said recess.

The cutting means of the invention is generally constituted by said three elements, which are plates formed of abrasive material of the silicon-carbide type or the like having a resin binder, preferably a synthetic resin being used. These plates are pressed plates and substitute the abrasive grits used up to now. Thus it is only necessary to add during the working process water, since the plates themselves provide the rasping or cutting material, although, if desired, a continuous supply of an extra sand portion, to increase the rasping and cutting action, may be provided.

It will be understood that in view of the fact that the hardness of the plates is higher than that of the supporting blades, the wear of the plates will control the wear of the blades. The cutting blades or saw blades will thereby wear out proportionally to the wearing out of the abrasive plates, whereby the life of the blades will be controlled by the life of said plates.

It is convenient that the engaging edges of the three plates are in tongued and grooved form in order to provide a better linkage of the assembly. The three plates may be covered by an adhesive such as a synthetic adhesive or a rubber base adhesive in order to render the linkage more elastic. In case it is desired, the synthetic adhesive may cover only the joints, between the plates as well as the joints of the plates with the blade. Substantially the same effect may be achieved by using natural or synthetic wax, such as paraffin which is deposited preferably between the joints formed by the edges of the three plates or elements.

The expression "cutting element" or "cutting effect" and the like, which is used in this specification as well as in the claims, is to be understood as including the "cutting" effect as well as the "rasping" effect produced by the particles adhered to and/or separated from those plates during the working strokes.

In view of the fact that the plates are pressed, they may be formed in such a way that the graining thereof varies preferably in such a manner that at the beginning of the working of the blades, particles of greater size are loosened from the plates and thereafter particles of gradually decreasing size are separated. However, if desired the granules may be arranged in a different sequence in the plates.

The granules may be formed of various substances such as silicon carbide, quartz, aluminum oxide (corundum), boron carbide, diamonds, etc.

Instead of using these rasping substances in combination with a synthetic resin as a binder therefor for manufacturing the plates, metallic plates may be used in which case the wedge, which is also made of metal has mounted in it a special steel tool, e. g. tungsten carbide (vidia), so arranged that one of its surfaces constitutes the working surface of the wedge. In this case the other two plates merely carry out the role of supporting means for said wedge and therefor, instead of metal, hardened rubber, synthetic resin or the like may also be used for them.

In the preferred embodiment of the invention, the two lateral elements in contact with the converging faces of the recesses are provided with two semi-circular projections in the upper part thereof constituting anchoring means for said elements; the recesses have of course corresponding cavities in which said projections are housed.

It is important to point out, that in a saw blade a plurality of these cutting means are arranged which must be spaced one from each other by a distance smaller than that of the working stroke of said supporting blade.

A further feature of the present invention is that a series of cutting means may be arranged along each of the longitudinal edges of a supporting blade and it is convenient to displace the two series with regard to each other so that the central section of the blade is not too much weakened.

From the foregoing it is apparent that one of the objects of the present invention is to provide a saw blade or a cutting blade which is provided with special means which enlarge the life of the tool and consequently increase the production per hour.

Another object is to provide a tool which may be easily manufactured and is of low cost.

A further object of the present invention is to provide a cheaper tool per square inch than those now on the market in view of the fact that the blades which constitute the support for the cutting elements, and which are generally made of steel, do not need to be of a special steel.

Another object is to provide a cutting tool which due to the distribution of its active elements increase the useful life of said tool.

A further object is to provide a cutting means constituted by three plates, the graining of which varies in size.

Another object is to provide a cutting means which at the same time provides the rasping material, whereby only water is required as a lubrication means.

These and further advantages and objects of this invention will become apparent in the course of the following description taken in connection with the accompanying drawings illustrating by way of example a new tool in several embodiments, and wherein:

Fig. 1 is a lateral elevation of a part of a tool according to the present invention.

Fig. 2 is a cross-section along line II—II of Fig. 1.

Fig. 3 is a detail shown in plan of a cutting means formed by three elements, as shown in Fig. 1.

Fig. 4 is a detail of a lateral elevation of another embodiment of the new tool.

Fig. 5 is a cross-section along line V—V of Fig. 4.

Fig. 6 is still another embodiment of the invention in which more than three elements are used as the cutting means.

In the different figures, the same reference numerals have been used for indicating like or similar parts.

As may be seen in Figs. 1 to 3, in which a preferred embodiment of the invention is shown, the saw blade 1, the longitudinal center line of which is identified by 2, has two longitudinal opposite edges 3 and 4, each of which is provided with a series of spaced recesses 5 and 6, respectively.

A recess 5 (to the left of the Fig. 1) corresponding to edge 3 has been shown without a cutting means and the other recess 5 (to the right of the same figure) is illustrated as provided with a cutting means formed by three elements 7, 8 and 9, in which elements 7 and 9 are equal. These elements 7 and 9 have a small base 10 and a long top 11 and two lateral faces 12 and 13 respectively. The lateral face 12 is provided, in the part adjacent to the long top 11, with a semi-circular projection 14, which constitutes an anchoring means for the cutting means. The third element, which is the central element 8 constitutes a wedge which has a long base 15 and a small top 16, said wedge being located in such a way, that the said short and long parts are inverted with respect to the parts 10 and 11, whereby precisely element 8 is in a position to carry out satisfactorily its wedge function with regard to the lateral elements 7 and 9. In order that the three elements 7 to 9 are accordingly linked together and also linked to the recesses 5 or 6, these elements as well as the wedges are tongued and grooved as specially shown in Fig. 3, wherein these connections have been generally indicated by reference number 17. It is obvious that instead of using these tongue and groove connections other convenient linkages may be employed.

Instead of using one only wedge 8, in case it is desired that the cutting means have a longer length, the number of wedges may be increased as shown in Fig. 6, wherein three wedges 8' are used.

In Figs. 4 and 5 another embodiment is shown, in which instead of using the plates 7, 8 and 9 formed of a mixture of synthetic resin and a granular abrasive, metallic plates 7'', 8'' and 9'' are used. Wedge 8'' has a large base 15'' which is slightly inclined, constitutes the only working surface in view of the fact that said wedge has mounted thereon a small, special metal plate-tool 18, for instance of tungsten carbide, which is used as the cutting tool. If it is desired, the lateral plates 7'' and 9'' may be made of hardened rubber or synthetic resin or similar material, since those plates have only the function of fastening means.

Returning now to Fig. 1, it may be seen therefrom that the series of recesses 5 and 6 are displaced with respect to each other, so that the space occupied by the plates of one series is opposed to a surface having no plates at the opposite edge of the blade, corresponding to the other series, whereby the saw blade 1 is thereby not unduly weakened.

Due to this arrangement, it is possible that a saw blade one side of which has been worn out to the maximum admissible limit, which is indicated by means of triple chain line 19, may be turned around in the frame so that the other edge, in this event edge 4, can be used, and thereby only the middle part of the blade 1 has finally to be scrapped.

The mounting of the plates 7 to 9 in the recesses 5 and 6, respectively, is very simple, since it is necessary only to house first the lateral plates 7 and 9 therein, and then force the wedge 8 or its equivalents into the space which remains between the two lateral faces 13, whereby an elastic connection of the three elements is obtained.

If desired, the cutting means formed by these three or more elements, may be covered conveniently with a synthetic adhesive or the like, which upon hardening constitutes an elastic coating on the surfaces of said elements.

Instead of using a synthetic adhesive covering the whole of the surfaces, it is also possible to use wax in which case, said wax should be applied only between the joints.

By adding these auxiliary elastic means, the new tool is specially preserved against shocks.

Although in this specification reference was made only to rectangular saw blades, acting as supports for the cutting elements, it is to be understood that this invention may also be applied to circular saw blades, etc.

I claim:

1. A new tool of the type comprising a saw blade for cutting marble, granite and the like material, which comprises a support having an outer margin for contacting the material to be worked by means of said tool, said support being provided with at least one recess including two opposed, spaced lateral faces constituting a housing for at least a part of a cutting means of said tool, said cutting means comprising at least three elements including a wedge-like element having a pair of opposed edges and a pair of lateral elements each having a pair of opposed sides, one of said sides of each of said lateral elements engaging a respective one of said lateral faces and each of said edges of said wedge-like element engaging the other side of one of said lateral elements, adhesive means covering said three elements of said cutting means, one of said elements, at least, having cutting tool properties and said three elements substantially filling said recess.

2. A new tool of the type comprising a saw blade for cutting marble, granite and the like material, which comprises a support having an outer margin for contacting the material to be worked by means of said tool, said support being provided with at least one recess including two opposed, spaced lateral faces constituting a housing for at least a part of a cutting means of said tool, said cutting means comprising at least three elements including a wedge-like element having a pair of opposed edges and a pair of lateral elements each having a pair of opposed sides, one of said sides of each of said lateral elements engaging a respective one of said lateral faces and each of said edges of said wedge-like element engaging the other side of one of said lateral elements, adhesive means covering said three elements of said cutting means, said adhesive means having a rubber base, one of said elements at least having cutting tool properties and said three elements substantially filling said recess.

3. A new tool of the type comprising a saw blade for cutting marble, granite and the like material, which tool comprises a support having an outer margin for contacting the material to be worked by means of said tool, said support being provided with at least one recess including two opposed spaced lateral faces constituting a housing for at least a part of a cutting means of said tool, said cutting means comprising at least three elements including a wedge-like element having a pair of opposed edges and a pair of lateral elements each having a pair of opposed sides, one of said sides of each of said lateral elements engaging a respective one of said lateral faces and each of said edges of said wedge-like element engaging the other side of one of said lateral elements, said three elements of said cutting means being linked together by means of wax coated tongue and groove connections, one of said elements at least having cutting tool properties and said three elements substantially filling that recess.

4. For a saw blade for cutting marble, granite and the like material, a detachable cutting means, said saw blade having an outer margin for contacting the material to be worked, a recess extending from substantially midway the blade to the outer surface thereof and having a mouth at said outer margin, said mouth having a width lengthwise of the blade smaller than any parallel widthwise dimension of said recess, said recess constituting a housing for at least a part of said cutting means, said cutting means comprising at least three elements, one of which is a wedge-like element, said three elements of said cutting means being composed of a granular abrasive and a resin as a binder, and the part of said three elements housed in said recess, substantially filling said recess.

5. A saw for cutting marble, granite and like material comprising, in combination, a saw blade formed with a plurality of recesses extending inwardly of at least one edge thereof, the said recesses each having a base portion and a pair of opposite side portions and the said saw blade at each of said recesses being formed with a pair of cut out portions extending laterally of said side portions of said recesses at the point where said side portions join said base portions; and at least three connected cutting elements of substantially the same length located in side by side relation in each of said recesses in a direction along the base portions thereof, the outer side edges of the outer cutting elements abutting against the entire side portions of each of said recesses and against the base portions thereof and being provided with projections which matingly engage said cut out portions whereby said outer cutting elements thereby hold themselves and the central cutting element in the saw blade, the inner side edges of said outer cutting elements converging inwardly towards each other and the base portions of said recesses and the side portions of the central cutting elements also converging inwardly toward each other and the base portions of the recesses and abutting at substantially their entire length against said converging inner sides of said outer cutting elements whereby the central cutting elements form wedges which press the outer cutting elements against the side portions of the recesses.

6. A saw for cutting marble, granite and like material comprising, in combination, a saw blade formed with a plurality of recesses extending inwardly of at least one edge thereof, the said recesses each having a base portion and a pair of opposite side portions and the said saw blade at each of said recesses being formed with a pair of cut out portions extending laterally of said side portions of said recesses at the point where said side portions join said base portions; and at least three connected cutting elements of substantially the same length located in side by side relation in each of said recesses in a direction along the base portions thereof, the outer side edges of the outer cutting elements abutting against the entire side portions of each of said recesses and against the base portions thereof and being provided with projections which matingly engage said cut out portions whereby said outer cutting elements thereby hold themselves and the central cutting element in the saw blade, the inner side edges of said outer cutting elements converging inwardly towards each other and the base portions of said recesses and the side portions of the central cutting elements also converging inwardly toward each other and the base portions of the recesses and abutting at substantially their entire length against said converging inner sides of said outer cutting elements whereby the central cutting elements form wedges which press the outer cutting elements against the side portions of the recesses, said central cutting elements each having an inner edge located adjacent to but spaced from the respective base portions of said recesses, whereby, when longitudinal stresses are applied to the saw blade during the use thereof so as to pull the side portions of the recesses slightly apart from each other, said central cutting elements may be moved inwardly by the material being cut toward the respective base portions of the recesses to continuously wedge the outer cutting elements against the side portions of the recesses.

7. A saw for cutting marble, granite, and like material comprising, in combination, a saw blade formed with a plurality of recesses extending inwardly of at least one edge thereof, the said recesses each having a base portion and a pair of opposite side portions and the said saw blade at each of said recesses being formed with a pair of cut out portions extending laterally of said side portions of said recesses at the point where said side portions join said base portions; a pair of holding elements located in each of said recesses and having outer sides which abut against the entire length of the side portions of each of said recesses, and having ends which abut against the base portions of each of said recesses, the said holding elements having projections extending from said outer sides thereof and matingly engaging said cut out portions and having inner sides which converge inwardly towards the base portion of each of said recesses, the said holding elements being made of a non-abrasive material; and a wedge-shaped cutting element located in each of said recesses and having side portions which converge inwardly toward the base portion of each of said recesses, the said side portions being located at substantially their entire length in abutment with said inner sides of said holding elements, respectively, whereby said wedge-shaped cutting element presses the holding elements against the side portions of each of said recesses, the said wedge-shaped cutting element being made of grains of silicon carbide embedded in a resin binder.

8. A saw for cutting marble, granite, and like material comprising, in combination, a saw blade formed with a plurality of recesses extending inwardly of at least one edge thereof, the said recesses each having a base portion and a pair of opposite side portions and the said saw blade at each of said recesses being formed with a pair of cut out portions extending laterally of said side portions of said recesses at the point where said side portions join said base portions; a pair of holding elements located in each of said recesses and having outer sides which abut against the entire length of the side portions of each of said recesses, and having ends which abut against the base portions of each of said recesses, the said holding elements having projections extending from said outer sides thereof and matingly engaging said cut out portions and having inner sides which converge inwardly towards the base portion of each of said recesses, the said holding elements being made of a non-abrasive material; and a wedge-shaped cutting element located in each of said recesses and having side portions which converge inwardly toward the base portion of each of said recesses, the said side portions being located at substantially their entire length in abutment with said inner sides of said holding elements, respectively, whereby said wedge-shaped cutting element presses the holding elements against the side portions of each of said recesses, the said wedge-shaped cutting element being made of grains of silicon carbide embedded in a resin binder, the said grains being of different sizes with the larger grains thereof being located at that portion of said cutting element which first engages the material being cut.

9. A saw for cutting marble, granite and the like material comprising, in combination, a saw blade having a cutting edge portion formed with at least one recess including two opposed, spaced lateral faces constituting a housing for at least a part of a cutting means, said cutting means comprising at least three elements consisting of a wedge-like element having a pair of opposed edges and a pair of lateral elements each having a pair of opposed sides, one of said sides of each of said lateral elements engaging a respective one of said lateral faces of said housing and each of said edges of said wedge-like element engaging the other side of one of said lateral elements, at least one of said elements having cutting tool properties and said elements substantially filling said recess.

10. A saw comprising, in combination, a saw blade having a cutting edge portion; cutting tool support means located at said cutting edge portion of said saw blade and comprising a pair of opposite side portions which are spaced from each other along their entire length, said side portions respectively having inner ends located opposite each other and being interconnected by a base portion of said support means, said opposite side portions of said support means converging toward said base portion of said support means; and a wedge-shaped cutting tool having opposite sides converging toward an end of said cutting tool and being mounted between said side portions of said support means with said sides of said cutting tool respectively engaging said side portions of said support means and with said end of said cutting tool located adjacent to, but spaced from, said base portion of said support means, said cutting tool having a portion, opposite said end thereof, extending beyond said cutting edge portion of said saw blade so that the cutting action of the latter wedges said cutting tool between said side portions of said support means and automatically moves said end of said cutting tool toward said base portion of said support means upon movement of said side portions of the latter away from each other.

LUIS PATELLA.

(References on following page).

REFERENCES CITED

The following references are of record in the file of this patent:

UNITED STATES PATENTS

| Number | Name | Date |
|---|---|---|
| 113,993 | Emerson | Apr. 25, 1871 |
| 273,054 | Foerster | Feb. 27, 1883 |
| 626,533 | Forster | June 6, 1899 |
| 885,603 | Gelins | Apr. 21, 1908 |
| 1,046,737 | Conklin | Dec. 10, 1912 |
| 1,063,380 | Peirce | June 3, 1913 |
| 1,065,833 | Peckner | June 24, 1913 |
| 1,198,871 | Russ | Sept. 19, 1916 |
| 1,843,549 | Firth | Feb. 2, 1932 |
| 2,065,041 | Behr | Feb. 22, 1936 |